US008675019B1

(12) United States Patent
Feinstein

(10) Patent No.: US 8,675,019 B1
(45) Date of Patent: Mar. 18, 2014

(54) VIEW NAVIGATION GUIDANCE SYSTEM FOR HAND HELD DEVICES WITH DISPLAY

(75) Inventor: David Y. Feinstein, Bellaire, TX (US)

(73) Assignee: Innoventions, Inc., Houston, TX (US)

( * ) Notice: Subject to any disclaimer, the term of this patent is extended or adjusted under 35 U.S.C. 154(b) by 541 days.

(21) Appl. No.: 12/959,367

(22) Filed: Dec. 3, 2010

Related U.S. Application Data

(60) Provisional application No. 61/266,175, filed on Dec. 3, 2009.

(51) Int. Cl.
*G09G 5/00* (2006.01)
*G09G 5/02* (2006.01)

(52) U.S. Cl.
USPC ................................ 345/634; 345/589; 345/7

(58) Field of Classification Search
USPC ............................................................ 345/7
See application file for complete search history.

(56) References Cited

U.S. PATENT DOCUMENTS

| | | | | |
|---|---|---|---|---|
| 4,734,619 A * | 3/1988 | Havel | ............................ | 313/510 |
| 6,014,140 A | 1/2000 | Strand | | |
| 6,466,198 B1 | 10/2002 | Feinstein | | |
| 7,015,876 B1 * | 3/2006 | Miller | ................................ | 345/7 |
| 7,054,878 B2 | 5/2006 | Gottsman et al. | | |
| 7,115,031 B2 | 10/2006 | Miyamoto et al. | | |
| 7,184,063 B2 * | 2/2007 | Shum et al. | .................... | 345/629 |
| 7,467,356 B2 | 12/2008 | Gettman et al. | | |
| 7,966,125 B2 * | 6/2011 | Wipplinger et al. | .......... | 701/455 |
| 8,264,499 B1 * | 9/2012 | Landry et al. | ................. | 345/589 |
| 2005/0105821 A1 * | 5/2005 | Hibi et al. | ..................... | 382/274 |
| 2006/0111836 A1 * | 5/2006 | Fast et al. | ...................... | 701/210 |
| 2006/0259238 A1 * | 11/2006 | Jung et al. | ..................... | 701/209 |
| 2010/0146085 A1 * | 6/2010 | Van Wie et al. | ............... | 709/220 |
| 2012/0038663 A1 * | 2/2012 | Gustafsson et al. | .......... | 345/629 |

OTHER PUBLICATIONS

Ole-Ivar Holthe, Multimedia Presentation for Computer Games and Web 3.0, IEEE MultiMedia Magazine, 2009, USA, Digital Object Identifier 10.1109/MMUL.2009.76.

* cited by examiner

*Primary Examiner* — Ryan R Yang

(57) ABSTRACT

System and method for view navigation guidance system for a physical display that is smaller than the virtual display it needs to display. Guidance map placed in a heads-up display layer within a small user defined area of the physical display provides an instantaneous indication of the current position of the screen view with minimal obstruction of the contents information. Color selection for the guidance map is automatically determined based on the background color in the main display layer beneath the map. The guidance map area on a touch screen display may include tapping controls, and the position of the guidance map can be dynamically altered by the user during the view navigation to control the navigation parameters.

20 Claims, 6 Drawing Sheets

VIEW NAVIGATION GUIDANCE SYSTEM FOR HAND HELD DEVICES WITH DISPLAY

CROSS-REFERENCE TO RELATED APPLICATIONS

This application claims the benefit of provisional patent application Ser. No. 61/266,175, filed 2009 Dec. 3 by the present inventor, which is incorporated by reference.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates, in general, to the field of view navigation of mobile computing and communication hand-held devices utilizing an information display, and more particularly, to a view navigation guidance system that assists the user in guiding the navigation of the information display.

2. Description of the Related Art

Hand held devices with a small physical display often must show a virtual stored or computed contents display that is larger than the screen view of the physical display. Only a portion of the virtual display can be shown at any given time within the screen view, thus requiring an interactive process of view navigation that determines which particular portion of the virtual display is shown. This process must allow the user to scroll the entire virtual display. Various methods have been used to control view navigation, including keyboards, joysticks, touch screens, voice commands, and rotational and movement sensors. Since the user can see only the screen view, there is a need for an efficient guidance system to indicate to the user what portion of the virtual display is currently shown and which direction should the user scroll the screen view.

U.S. Pat. Nos. 5,510,808, 6,008,807 and 6,014,140, together with the references stated in these patents, describe the well known prior art scrollbar method for guiding view navigation. In this method, horizontal and vertical scrollbars, typically placed on the bottom and right boundaries of the display, indicate the relative position and size of the screen view to the virtual display. As the user scrolls the display, the scrollbars change to reflect the new position of the screen view. In application where the virtual display size changes dynamically the length of each scrollbar slider changes to reflect the relative width and height of the screen view compared to the virtual display.

Scrollbars view navigation guidance generally works well with large stationary displays. However, it exhibits major disadvantages for smaller displays used in hand held devices. The first disadvantage is that the user must look at both scrollbars in order to determine the screen view position within the virtual display. It is even more difficult for the user to determine the relative size of the screen view compared to the size of the virtual display since the user must assimilate the width information separately from the horizontal bar and the height information separately from the vertical bar.

Another disadvantage is that the scrollbars consume some valuable screen view spaces. For example, in a typical smart-phone with a 320×480=15600 pixels screen view, the scrollbars may reduce the usable screen to 300×460=13800 pixels, that is a reduction by almost 12%.

U.S. Pat. No. 7,467,356 describes a graphical user interface that includes a mini-map area that is placed on the display near the main information pan. The mini-map conveys a lot of information and therefore it must be placed in a separate and dedicated area that cannot be used for contents display. This poses a major disadvantage for small displays where every pixel is important and cannot be assigned exclusively for view guidance.

Originally, heads-up display (HUD) was developed for use in fighter airplanes where various data is projected on the front window so that the pilot can view both the projected data and the battlefield scene simultaneously. In the context of video games and virtual displays that use a stand-alone physical display, a heads-up display (HUD) is a partially transparent graphical layer containing important information placed on top of all the other graphical layers of the application information contents. All graphical layers are combined in vertical order for rendering in the physical display, giving the HUD layer a perceived affect of being on top. The HUD layer is assigned a transparency parameter Alpha which is varied from 0 (invisible) to 1 (fully opaque).

U.S. Pat. No. 7,054,878 illustrates the use of heads-up display on a desktop computer. U.S. Pat. No. 7,115,031 illustrates combination of local game view and common game view with multiple players, where the common game view is transparently rendered as HUD on top of the local game view. An article titled "Multimedia presentation for computer games and Web 3.0", by Ole-Ivar Holthe in IEEE MultiMedia, December 2009, discusses modern use of in-game head-up displays. Geelix HUD, an in-game Heads-Up Display for sharing game experiences with other users, is available from www.geelix.com. Version 4.0.6 first seen on internet Sep. 20, 2007. Use of HUD in gaming is described in Wikipedia at http://en.wikipedia.org/wiki/HUD_(video_gaming), while the concept of mini-map is shown in http://en.wikipedia.org/wiki/Mini-map.

Use of HUD display heretofore known suffer from a number of disadvantages. First, the HUD layer optically obstructs important contents data, which is a bigger problem in the small display of hand-held devices. Secondly, the HUD layer tends to grab user's attention, thus becoming a perceptual distraction to the user.

BRIEF SUMMARY OF THE INVENTION

With these problems in mind, the present invention seeks to improve the guidance provided to the user while navigating the virtual display. It uses a simplified guidance map that is shown via HUD in a small predefined area of the screen view. This guidance map is substantially limited to exhibit just two rectangle shapes representing the screen view inside the content view. It improves the HUD technique with emphasis on clarity and minimal optical and perceptual obstruction of data contents.

Since the guidance map comprises only two rectangles, it is mostly transparent, thus allowing the user to see the content layer that lies under it. The guidance map should also be colored in a way that will make it visible over the background, but not distracting. Due to the scrolling of the virtual display and changing contents information under the guidance map, the present invention uses dynamical color selection to paint the map's rectangles.

It is much easier for the user to determine where to steer the screen view in relation to the virtual display when looking only at a relatively small and very simple map within the screen view area as opposed to monitoring two scrollbars that are placed along the boundaries of the screen view. The map immediately conveys both relative position and relative size of the screen view compared to the virtual display. These benefits are useful for both small hand held displays as well as for larger stationary desktop displays.

In another embodiment of the present invention in systems that employ a touch screen interface, the view navigation monitor is placed on the screen view in a position that may be changed by the user during the view navigation. These position changes detected along predefine paths during the view navigation are used to send control signals to the system to change the navigation parameters. The present invention is very advantageous for view navigation based on rotational (tilt) and movement sensors. Such view navigation further uses various parameters that control the speed of navigation and its associated response to user's movements.

In yet another embodiment of the present invention, the predefined guidance map area may include functional switches that respond to tapping by the user.

These and other objects, advantages, and features shall hereinafter appear, and for the purpose of illustrations, but not for limitation, exemplary embodiments of the present invention are described in the following detailed description and illustrated in the accompanying drawings in which like reference numerals designate corresponding elements.

BRIEF DESCRIPTION OF THE SEVERAL VIEWS OF THE DRAWINGS

In the drawings, closely related figures have the same number but different alphabetic suffixes.

FIG. 1—(prior art) shows the use of scrollbars for determining the position of the screen view within the virtual display.

FIG. 2—shows the view navigation guidance system of the present invention which includes a proportional guidance map embedded in a heads-up display layered over the screen view. FIG. 2A shows the virtual display while

FIG. 3—provides a detailed view of the view navigation guidance map illustrating the relations between the screen view and the virtual display.

DETAILED DESCRIPTION OF THE INVENTION

Figure 1A:
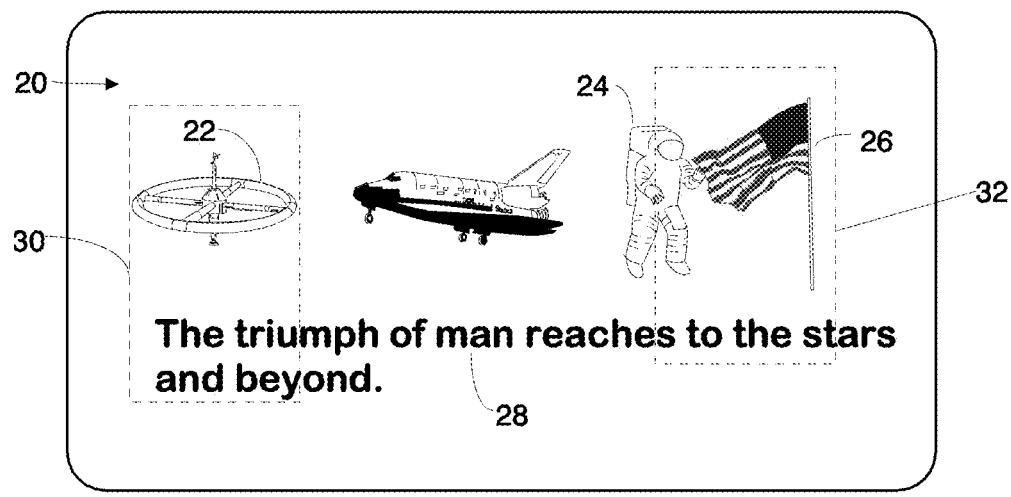
FIG. 1A shows the virtual display and FIG. 1B and FIG. 1C illustrate different screen views.
Figure 1B:
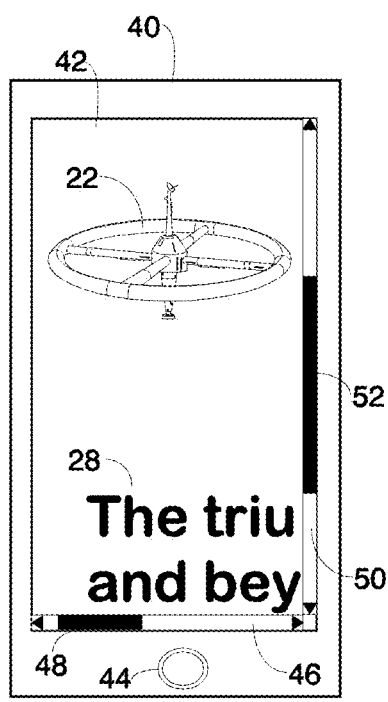
Figure 1C:
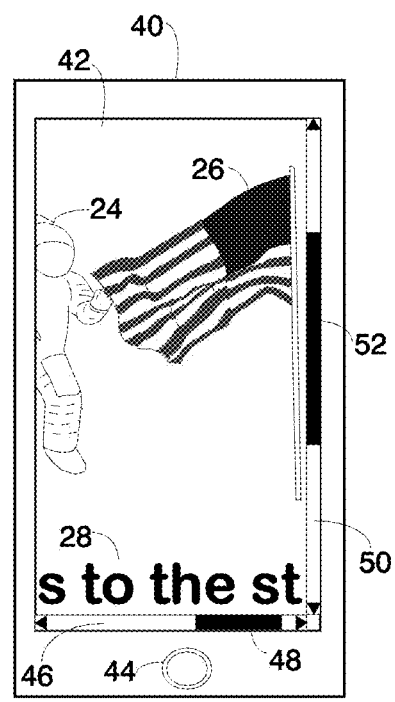

FIG. 1 (prior art) describes a typical view navigation guidance system based on scrollbars of the prior art, used in the context of a hand held device 40. The virtual display 20 in FIG. 1A is the stored or computed data that need to be displayed in the small screen view 42 of the hand held device 40 (in FIGS. 1B and 1C). The virtual display 20 comprises few graphical images 22, 24, and 26, as well as a text message 28. It should be noted that the virtual display may be retrieved from a stored virtual display memory area or computed on the fly based on data streaming (e.g. from a web site or from dynamically selected data files). The hand held device 40 typically has one or more operational button 44 or other controller like a joystick.

FIG. 1B shows the screen view 42 of the hand-held device 40 when it has been navigated to area 30 of the virtual display 20. FIG. 1C shows the screen view 42 when the view was navigated to area 32 of the virtual display. The screen view 42 includes a horizontal scrollbar 46 and a vertical scrollbar 50. The horizontal scrollbar 46 has a horizontal slider 48, and the vertical scrollbar has a vertical slider 52. Each slider's position along the scrollbar indicates the relative position of the screen view 42 within the virtual display 20 along the particular horizontal and vertical axis. The horizontal slider's width indicates the relative width of the screen view 42 to the width of the virtual display 20. Similarly, the vertical slider's length indicates the relative height of the screen view 42 to the height of the virtual display 20. It is clear that the user must consider both sliders' position and length in order to determine the screen view's size and its position in the virtual display 20. This can be very difficult and time consuming, particularly in situations where the screen view 42 is much smaller than the virtual display 20 and the navigation speed is relatively high.

It should be emphasized that the user cannot see the entire virtual display 20 within the screen view 42 unless he or she zooms out significantly. Therefore, it is desirable to have a better view navigation guidance system that allows the user to immediately determine the screen view 42 position with a quick glance at a generally small area.

Figure 2A:
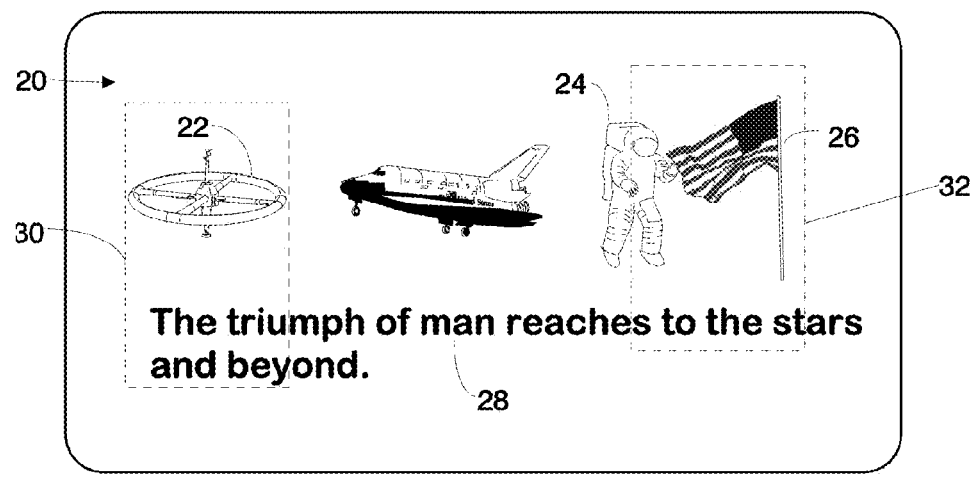
Figure 2B:
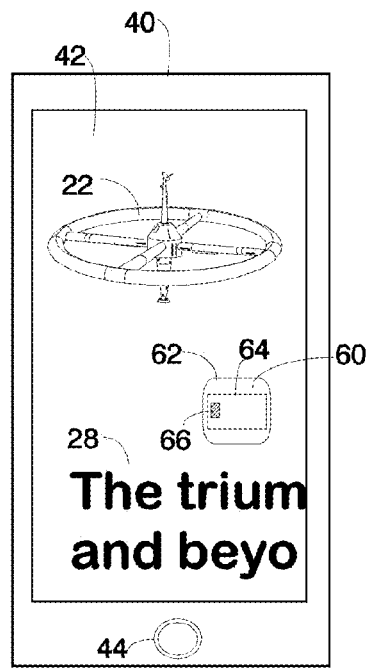
FIG. 2B and FIG. 2C illustrate the same screen views of FIG. 1.
Figure 2C:
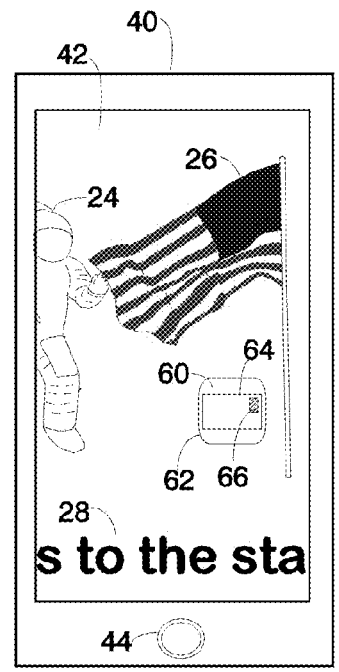

The view navigation guidance system of the present invention shown in FIG. 2 solves this limitation. FIG. 2A is a virtual display 20 similar to the one shown in FIG. 1A, and the screen view 42 in FIGS. 2B and 2C depicts the same virtual display areas 30 and 32 of FIGS. 1B and 1C. The scrollbars of FIGS. 1B and 1C are replaced with a view navigation guidance map 60, comprising a predefined small transparent view area 62 which is composed on a top layer of the screen view in a heads-up display (HUD) fashion. The well known heads-up display technique is used to display an element or a graphic view on top of a main view without obscuring the main view itself. It is generally achieved by layering the heads-up display above the main view and controlling its translucence level to be transparent. All graphical layers are combined in vertical order for rendering in the physical display, giving the HUD layer a perceived affect of being on top. The entire HUD area 62 of the navigation view guidance map 60 is set to be fully transparent. In devices that incorporate touch screen technology, the area 62 can be assigned a touch responder that is activated when touched by the user to control a predefined system function. Therefore, the boundary line of area 62 is preferably not visible.

The guidance map 60 includes two rectangle shapes 64 and 66 that represent the virtual display and the screen view, respectively. While most screen views have a rectangle shape, some dynamically changing virtual displays may have other transitional shapes. Such shapes will be represented by a minimal bounding rectangle 64. The height and width of the rectangle 64 is set proportional to the height and width of the virtual display 20. The scale factor is computed so that rectangle 64 fits most of the predefined guidance system's HUD area 62. Since rectangle 64 represents the virtual display 20 within the view navigation guidance map 60, it will hereinafter be referred to as the virtual display rectangle 64. The screen view 42 is represented by rectangle 66 which has dimensions that are scaled down by the same scale factor used to render the virtual display rectangle 64. The screen view rectangle 66 is placed within the virtual display rectangle 64 in a relative position to the position of area 30 and 32 within the virtual display 20. It is therefore very easy for the user viewing the view navigation guidance map in FIG. 2B to quickly determine that the view is from area 30 of the virtual display 20. Similarly, FIG. 2C immediately conveys to the user that the view is from area 32 of the virtual display 20.

FIGS. 3A and 3B detail two instances of view navigation guidance map 60 created for different sets of virtual display and screen views. FIG. 3A shows a situation similar to FIG. 2A where the virtual display is relatively wide. FIG. 3B shows the case when the virtual display is relatively high. FIG. 3A depicts a much larger zoom-in level than FIG. 3B. The screen view rectangle 66 is filled to emphasize it in a case like FIG. 3A where its size is much smaller than the virtual display rectangle. Since the view navigation guidance map 60 should not obscure the screen view 42, the virtual display rectangle 66 is made fully transparent, showing only the rectangle outline. Careful attention should be made in the selection of color, line width and transparency (also known as the alpha parameter in computer graphics) as it will be discussed in more detail in conjunction with FIG. 7 below.

Figure 4:
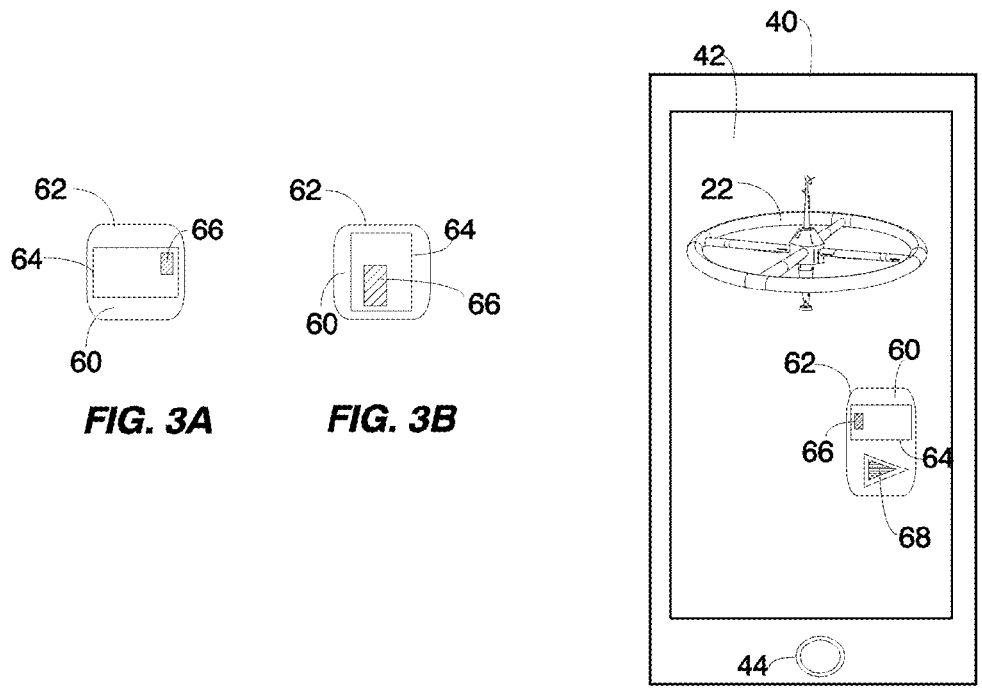
FIG. 4—depicts a guidance map that includes more controls on the heads-up display area.

The view navigation guidance map 60 may be extended to include more controls or indicators as shown in FIG. 4. The transparent area 62 assigned for the guidance map 60 is extended to include a touch switch 68 for use with embodiments of the present invention in devices with touch screen display. The touch switch control 68 is also created with a relatively transparent rendering to avoid obscuring the screen view. The shape and function of the touch switch 68 can be modified on the fly. It is also possible to have additional controls provided that they do not obscure the screen view. A single touch switch can be implemented with no additional main view obstruction by assigning a touch responder area to the entire transparent area 62. The user then activates the switch by simply tapping the guidance map 60.

Figure 5:
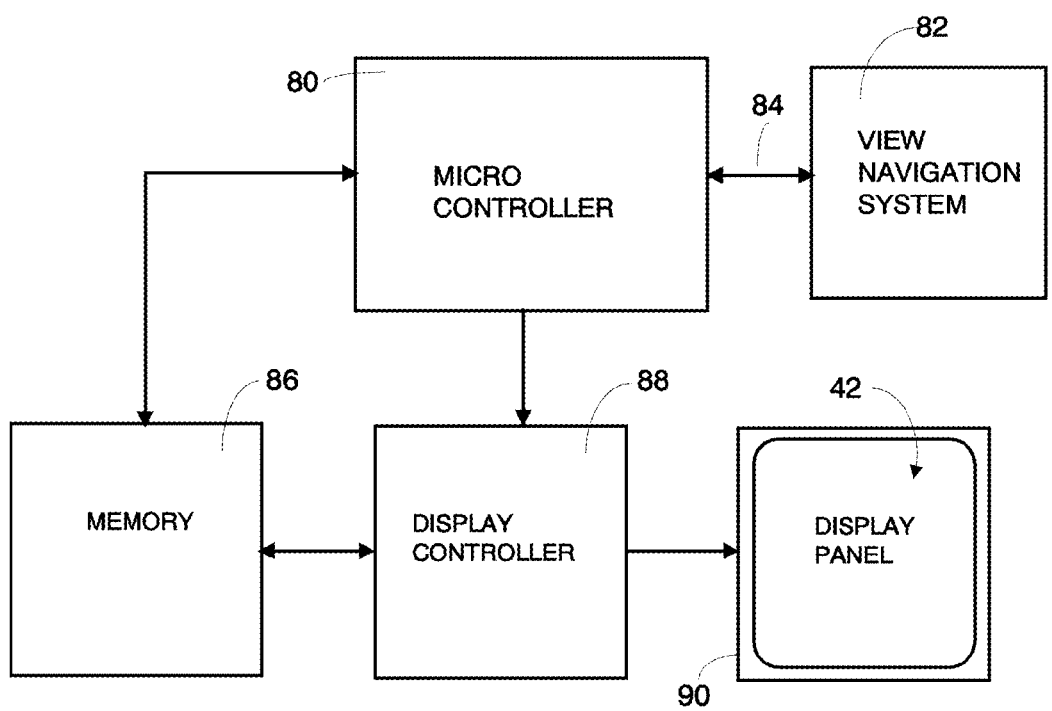
FIG. 5—illustrates the block diagram of the embodiment of a view navigation guidance system incorporating the present invention.

FIG. 5 discloses one embodiment of a view navigation guidance system incorporating the present invention. The processor 80 is typically a micro-controller processor providing the overall processing and control required by the system. A view navigation system 82 interfaces with the user to perform the required view navigation. It communicates with the micro-controller 80 via the communication channel 84. The view navigation system 82 may be tilt-based, comprising a set of rotation sensors (like a tri-axis accelerometer, gyroscope, tilt sensor, or magnetic sensor). One such system is disclosed in my U.S. Pat. Nos. 6,466,198 and 6,933,923 and has been commercialized under the trade name RotoView. Other view navigation systems like keyboard, joystick, voice command, and touch screen control can be used. The processor 80 uses a memory storage device 86 for retaining the executable code (system program), and various data and display information. A display controller 88 activates the physical display panel 90 which provides the screen view 42 to the user. The display controller 88 is controlled by the micro-controller 80 and interface with the memory storage 86 for creating the screen view 42. It should be apparent to every person familiar in the art that many variants of the block elements comprising this diagram can be made, and that various components may be integrated together into a single VLSI chip.

Figure 6:
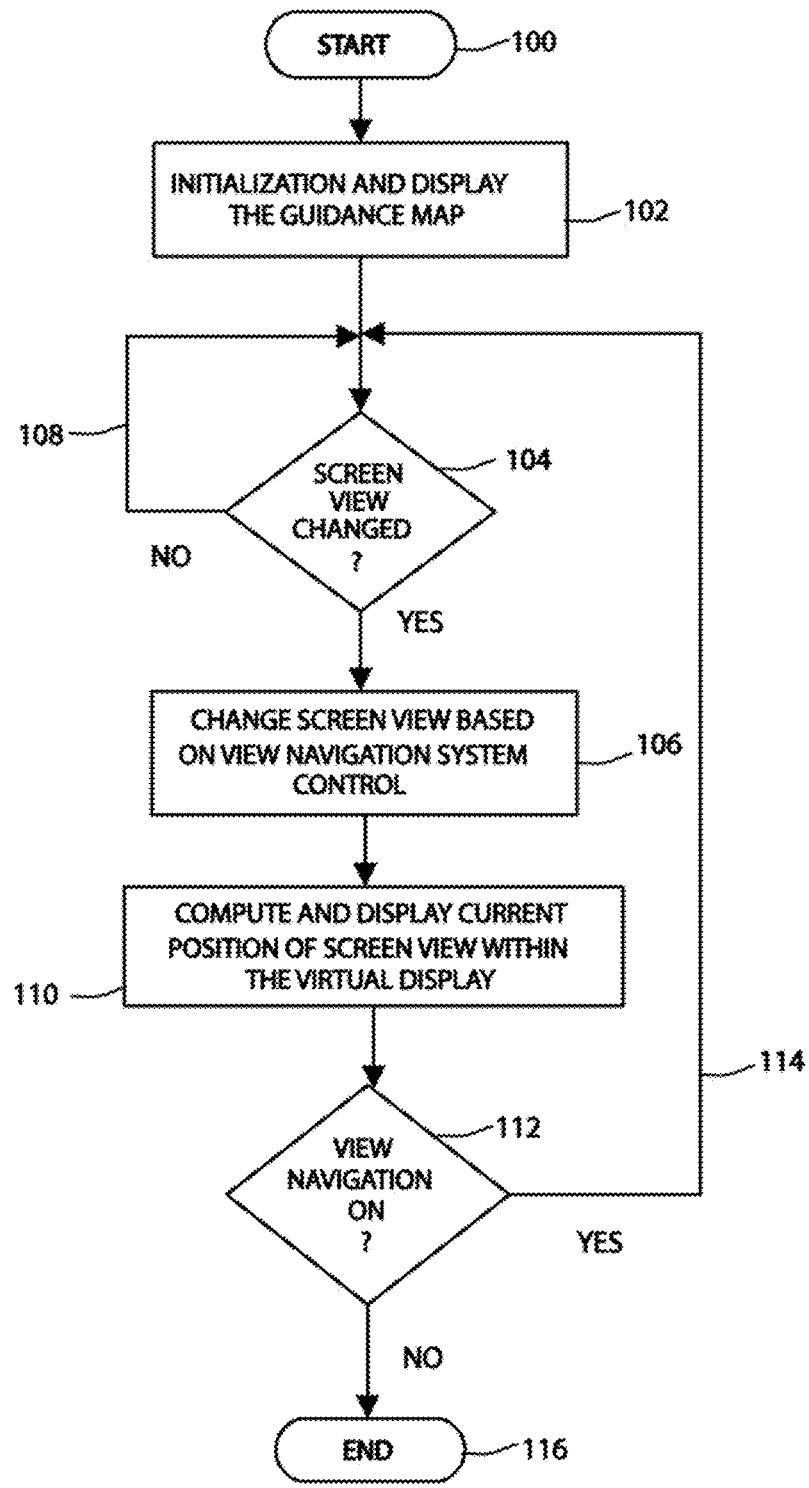
FIG. 6 outlines the software flow diagram for the embodiment of the invention of FIG. 5.

FIG. 6 illustrates the software flow diagram used to compute the view navigation guidance map of the system shown in FIG. 5. Any processor based system requires numerous software activities which are well known in the art. I only show in FIG. 6 the portion of the view navigation process that is relevant for the generation of the guidance map of the present invention. The process starts at node 100 whenever the view navigation system 82 initiates a start navigation command to the processor 80. At the initialization step 102, the processor first determines the dimensions of the virtual display rectangle 64 and computes the scale factor needed to reduce the rectangle so that it is embedded within the predefined area 62 of the guidance map 60. For example, if the map area 62 approximates a square, the larger of the width or height of the virtual display is proportionally reduced to fit the monitor area 62, and then the other dimension is reduced by the same scale factor. The same scale factor is then applied to compute the dimension of the screen view rectangle 66. The screen view 66 is then placed in a position within the virtual display rectangle 64 that reflects the screen view 42 actual position within the virtual display 20. The initial transparency and color of the monitor 60 is also determined in this step based on user's setup patterns, stored patterns, or the dynamic color selection algorithm described in FIG. 7 below. Step 102 draws and displays the initial configuration of the guidance map 60. Optionally the guidance map may be turned off (e.g. made invisible by setting its overall transparency to 0) when the view navigation mode ends or after a predefined delay after the navigation mode ends. In such case, step 102 should also turn the guidance map back on when the view navigation re-starts.

The view navigation system data and the processor 80 will determine the required changes in the screen view in step 104. This is done via polling of the navigation system data at a predefined rate or can equivalently be made in response to system interrupts. Changes are detected if the screen view scrolled the virtual display, or if the size of the virtual display has changed due to dynamic loading and release of the virtual display. If no change was detected, step 104 is repeated along the loop 108 at the navigation system predefined update rate. If the screen view needs to be scrolled, the amount of screen view position change is computed at step 106 as part of the main view navigation process. Step 106 may be performed several times per second. Smooth view navigation has been obtained in the RotoView system when the predefined update rate is 12-20 iterations per second. Increasing the update rate above 20 provides marginal improvements in only few cases of rapid navigation.

After the screen view is updated and redrawn in step 106 as part of the process of view navigation, the guidance map 60 must also be updated in step 110. In some applications like web browsing or map browsing, scrolling the screen view issues requests to the system to add contents data to some areas of the virtual display in the direction of scrolling, or releasing some other contents data that is no longer needed. In other applications, the contents data in the virtual display may be slowly accumulated throughout the view navigation process. Step 110 updates any changes in the shape of the virtual display and computes a new positioning of the screen view rectangle 66 within the virtual display rectangle 64. It then redraws the guidance map 60. It may also include a change in coloring or transparency level based on the screen view changing local colors below the rectangles 66 and 64, as described in FIG. 7. A counter divider or a threshold value may be used in step 110 to insure that the view monitor is updated at a lower rate than the rate at which the screen view is updated on the display 42. For example, in one implementation I perform step 110 only once for every 5 times that the actual screen view is moved. This reduced update is not noticeable by the user since the guidance map 60 is much smaller than the screen view.

At step 112 the micro-controller 80 determines if the view navigation mode is still on. If so, steps 104, 106 and 110 are repeated via 114. If the view navigation has terminated (by lack of subsequent user scrolling commands, or due to automatic exit from view navigation mode explained in my RotoView U.S. patents) the process ends at step 116. The view navigation guidance map 60 may optionally be turned off at this point, or after some predefined time delay. As mentioned, if the guidance map is turned off, it must be reactivated by step 102 when the view navigation resumes.

Figure 7:
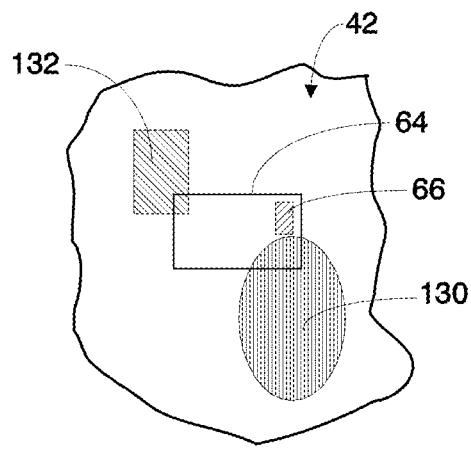
FIG. 7—illustrates color and transparency selection process for the guidance map that will minimize the obstruction of the screen view while still provide good readability.

It is important to insure that the guidance map 60 uses proper color, line width and transparency value selections to minimize the obstruction of the screen view while still providing good readability of the guidance system's information. These selections are performed in steps 102 and 110 of the block diagram of FIG. 6, taking into consideration the continuous changing contents of the main display layer. FIG. 7 illustrates the challenges of making these selections, using a simplified situation in a color physical display where two graphical objects 130 and 132 under the guidance map may have different colors.

Since the view area 62 of the guidance map 60 is preferably fully transparent (alpha is set to 0), only the virtual display rectangle 64 and the screen view filled rectangle 66 are shown on the HUD layer. Therefore, changes in the transparency value of the HUD layer can globally increase or decrease the overall contrast of the map's rectangles. In addition, the line width can be changed to increase or reduce the overall visibility of the rectangles, particularly in monochrome displays. Depending on background objects' colors, adjusting the global transparency value of the HUD layer may not be sufficient to improve the user's experience. Therefore, smart selection of colors for the map's rectangles 64 and 66 is clearly important. This selection can be made using a global or a local approach.

The global approach selects a single primary color for painting the guidance map 60 as a function of the overall global background color of the screen view's contents in the background area directly beneath the predefined guidance map area 62. Alternatively, several additional colors may be selected to paint individual rectangles within the guidance map, so that their relative relation may be more easily readable by the user, while the overall guidance map is made less obstructive to the main data. The overall global background color can be determined in several methods. One method sets the global background color as the average RGB primary colors values of all the pixels in the background area beneath the map 60.

Another method examines the predefined background area and determines the dominant color based on colors distribution weighed by some of their perceptual properties. It then assigns the dominant color as the global background color.

Once the global background color is determined, the processor selects a global painting color to paint the guidance map. There are several methods to select a painting color corresponding to a given background color. One method computes the painting color by a mathematical function that transforms the primary colors values of the global background color to achieve the desired contrast, based on the user setup preferences. Colors are generally defined by their additive primary colors values (the RGB color mode with red, green, blue) or by their subtractive primary colors value (the CMYK color model with cyan, magenta, yellow and key black). In another method, the painting color may be selected from a predefined stored table that associates color relations based on desired contrast values. The stored table receives the background color and the desired contrast values as inputs and it outputs one or more painting colors. For example, the stored table may indicate that if the global background color is black, the painting colors should be white or yellow to achieve strong contrast, and gray or green to achieve a weak contrast.

Using the local approach, the map's rectangles are colored with varying colors along small sections of each rectangle. The rectangle is virtually separated into arbitrarily small sections, allowing desirable color selection to be made per each section based on the current local background in a small area under each section.

A predefined local background area must be specified within a circle with predefined radius or some other common bounding polygon shape attached to each subsection. The local background color and the associated local painting color for the rectangles are determined per each section of the guidance map 60 using the painting selection methods discussed above. It is clear that while the local approach can achieve the best optimal coloring of the map's rectangle, the global method is faster.

Figure 8:
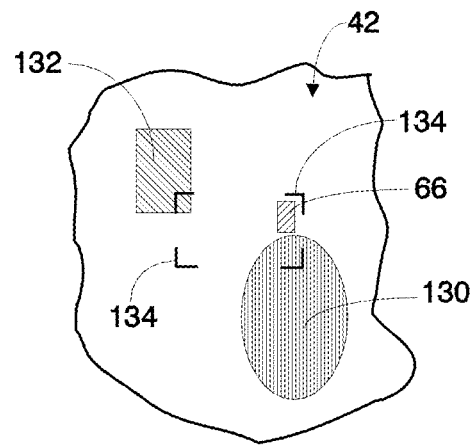
FIG. 8—depicts a clipping of the content view rectangle that will further minimize the obstruction of the screen view.

FIG. 8 shows that the larger virtual display rectangle 64 may be replaced with four corner markers 134 which may be drawn in the HUD layer with more contrast than the drawing of the full rectangle 64 in the case of FIG. 7. As mentioned above, the increased contrast can be achieved with more opaque transparency, thick lines and highly contrasting color selection. The markers 134 are placed in the corners of the virtual display rectangle 64 of FIG. 7. Use of such markers in lieu of the full rectangle 64 significantly reduces the obstruction of the screen view by the guidance map.

Figure 9:
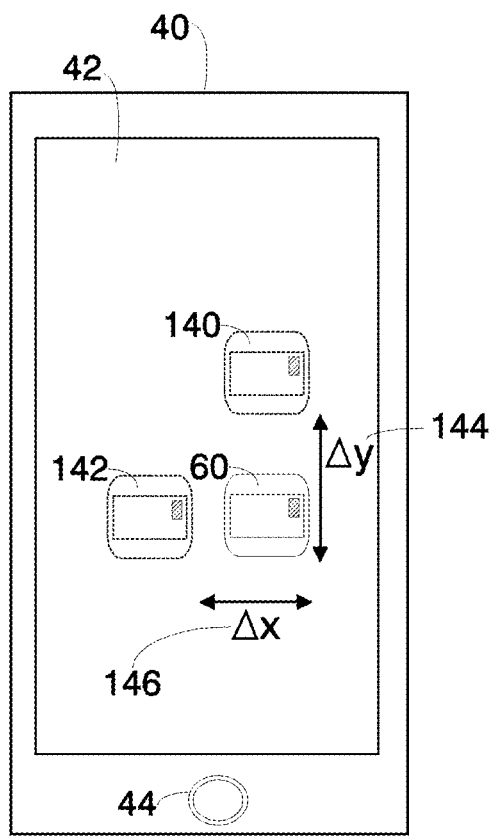
FIG. 9—shows another embodiment of the present invention with a touch sensitive display where the guidance map may be dragged by the user to change view navigation parameters on the fly.

In another embodiment of the present invention, the view navigation guidance system is implemented with a physical display equipped with touch screen interface. The guidance map 60 can be dragged on the screen view 42 by the user from its predefined position and the user can also tap the map to perform a predefined control function. The interactive changes in the position of the guidance map 60 along predefined paths during view navigation can be used to change the view navigation parameters on the fly. This embodiment of the present invention is shown in FIG. 9, and it follows a similar block diagram like the one shown in FIG. 5 with touch screen capability added to the display panel 90. The guidance map may be moved vertically by amount $\Delta y$ (144) to position 140, or horizontally by $\Delta x$ (146) to position 142. In many cases the user may drag the guidance map with both X and Y displacements. These displacements trigger changes in the parameters of the current view navigation session in accordance with predefined paths.

For the following discussion of the functional block diagram, we assume that this embodiment is implemented in conjunction with a tilt-based view navigation system like the aforementioned RotoView. In addition, we assume in this example that changes in the vertical direction can increase or decrease the speed of navigation, while changes in the horizontal direction selects different navigation system profiles (e.g. different response graphs).

Figure 10:
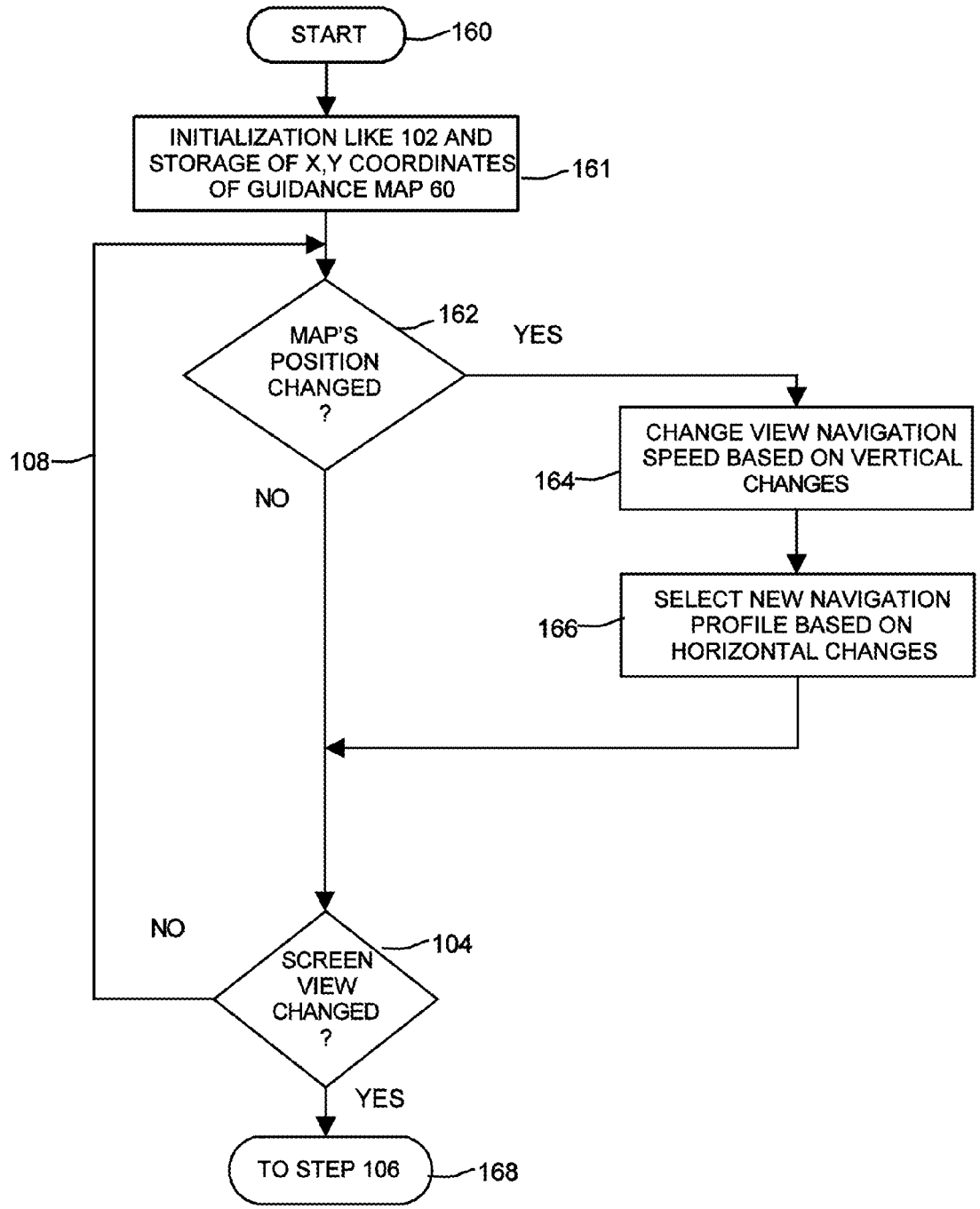
FIG. 10—outlines the software flow diagram of the embodiment of FIG. 9.

FIG. 10 outlines the software flow diagram of the embodiment of FIG. 9. The entire process is added to the overall operation of software flow diagram of FIG. 6, with same numerals assigned to corresponding steps. This process starts at step 160 (which is the same start step 100 of FIG. 6) and follows with an initialization step 161 that repeats the step 102 of FIG. 6 with the additional process of storing the initial x and y position coordinates of the guidance map 60 in the screen view. In step 162 the processor examines the current position coordinates x and y of the guidance map 60 and determines if the user has dragged the guidance map. If the guidance map was not dragged (or the changes are below a noise limit value), the process continues with steps 104 and 106 of the software flow diagram of FIG. 6. If the guidance map was dragged, step 164 compares the vertical changes and uses the difference to compute a change in the view navigation speed. For example, if the vertical displacement $\Delta y$ is positive (the monitor dragged up), then the speed of navigation is increased, and vice versa.

Step 166 further determines the horizontal displacement $\Delta x$, and use this value to select a different navigation profile. Such selection is made whenever $\Delta x$ reaches discrete values. For example, if abs($\Delta x$)<30 pixel width, no change is made. When it is between 80 and 30 pixels, profile 2 replaces profile 1, and when it is between −30 and −80 profile 3 replaces the current profile. For another example, dragging the guidance map 60 along the horizontal toward the center of screen view 42 may decrease its transparency (as it is more in the center of the view). When dragging the guidance map towards the edge increases the transparency, thus making it more visible. Many other arrangements can be used to associate the guidance map's displacement along predefined paths with various parameter selections. It should be noted that for one hand operation, dragging of the guidance map 60 can be easily made by the user's thumb.

Although the description above contains many specifications, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A method of color synthesis for rendering geometrical shapes in a partially transparent heads-up display layer over a main display layer with changing contents, comprising the steps of:
   (a) dividing said geometrical shapes into a plurality of sub-sections, each sub-section will be colored by a local painting color;
   (b) assigning a local background area of predefined size and shape on the main display layer directly under each said sub-section, said local background area bounds said sub-section, and associating said local background area with said sub-section;
   (c) determining a representative local background color for each said local background area;
   (d) synthesizing a local sub-section painting color for each sub-section by applying a direct color transformation on said representative local background color of said associated background area, wherein said direct color transformation is exclusively dependent on said representative local background color, and wherein said transformation achieves a desired level of contrast between said heads up display layer and said main display layer; and
   (e) rendering said geometrical shapes in said partially transparent heads-up display layer using said synthesized local sub-section painting colors wherein all original colors of changing contents of said main display are preserved.

2. The method of claim 1, wherein step (c) determines said local background color of said predefined local background area by averaging the primary colors values of each pixel of said local background area.

3. The method of claim 1, wherein step (c) determines said representative local background color of said predefined local background area by selecting the dominant color within said predefined local background area.

4. The method of claim 1, wherein the direct color transformation of said representative global background color for each sub-section is computed by decomposing said global background color into its primary color values and adjusting the primary colors values in accordance with user setup preferences.

5. The method of claim 1, wherein the direct color transformation of said representative global background color for each sub-section is computed by a stored color association table, said color association table correlates background colors to painting colors that meet a predefined contrast.

6. A method of selecting a primary color to paint geometrical shapes in a partially transparent heads-up display layer over a main display layer with changing contents, so that the visual and perceptual obstruction of the contents of said main display layer caused by said geometrical shapes is minimized, comprising the steps of:
   (a) determining a minimal background area comprising the portion of said main display layer that is directly underneath said geometrical shapes so that said background area bounds all said geometrical shapes;
   (b) determining primary colors values for a global background color for said background area based on color distribution of all the pixels of said background area multiplied by perception weight values; and
   (c) synthesizing said primary painting color that is exclusively dependent on said primary colors values of said global background color using a direct color transformation of said primary colors values.

7. The method of claim 6, wherein the direct color transformation of said global background color is computed by a stored color association table, said color association table correlates a set of background colors to painting colors that meet a predefined contrast and visibility parameters set by user setup preferences.

8. The method of claim 6, further comprising the selection of a plurality of additional secondary painting colors directly transformed from primary colors values of said global background color, said secondary colors are used to paint individual shapes selected from said geometrical shapes so that they are distinguished from other shapes painted by said primary painting color.

9. A view navigation guidance system for a hand-held device, comprising:
   a processor;
   a physical display having a screen view coupled to the processor;
   a virtual display with contents information which is able to be partially displayed on said screen view, said virtual display is larger than said screen view;
   a view navigation means which a human operator can use to control which part of said virtual display is shown on said screen view;
   a storage device coupled to said processor for storing executable code to interface with said physical display and said view navigation means, the executable code comprising:
      (a) code for navigating said screen view over said virtual display, responsive to said operator's commands;

(b) code for rendering a guidance map at a predefined location on a graphical layer, said guidance map comprising two rectangles, first rectangle represents the size and form of said virtual display reduced by a computed scale factor to fit said first rectangle into a predetermined size on said screen view, second rectangle represents the size and form of said screen view reduced by said computed scale factor, said second rectangle is enclosed within said first rectangle at the proportional position of said screen view within said virtual display;

(c) code for displaying said graphic layer with said guidance map as a partially transparent heads-up display on said screen view at a predefined map location;

(d) code for storing and retrieving a record of the horizontal and vertical coordinates of the location of said guidance map on said screen view; and (e) code for enabling the user to move said guidance map anywhere on said physical screen and simultaneously updating said predefined map location with said record of guidance map location, whereby said guidance map assists said operator to direct the navigation of said screen view over said virtual display with minimal obstruction of the contents.

10. The view navigation guidance system of claim 9 wherein said executable code further comprising:
code to turn on said guidance map during view navigation and to turn off said guidance map when the view navigation ends.

11. The view navigation guidance system of claim 10 wherein said guidance map is turned off after a predetermined time period after the end of said view navigation.

12. The view navigation guidance system of claim 9 wherein only the corners of said first rectangle are rendered in said guidance map whereby said guidance map creates minimal obstruction of the contents information shown in said screen view.

13. The view navigation guidance system of claim 9 wherein said code to display said guidance map as heads up display over said contents information further comprising an alpha transparency value, said alpha transparency value of said heads-up display is adjusted dynamically to cause a desired contrasting effect to the continuous changing contents of the local background.

14. The view navigation guidance system of claim 9 wherein said code to display said guidance map as heads-up display over said contents information further comprising:
code to determine the dominant background color in the area of said contents information appearing under said guidance map and selecting global colors for said guidance map that will cause a predefined contrasting effect to the contents background.

15. The view navigation guidance system of claim 9 wherein said code to render said guidance map as heads up display over said contents information further comprising:
code to divide said first rectangle and said second rectangle into a plurality of sub-sections;
code to determine a representative local background color of said contents information appearing under each sub-section of said guidance map; and
code to synthesize a painting color for each sub-section of said guidance map by applying a direct color transformation on said representative local background color, wherein said direct color transformation is exclusively dependent on said representative local background color, and wherein said synthesized painting color will cause a predefined contrasting effect compared to said local background.

16. The view navigation guidance system of claim 15 wherein the code to synthesize local painting color of each sub-section of said guidance map further comprises a stored table of color values that are mapped to plurality of local background colors with different values of contrast, said table is accessed to determine the color value to paint each sub-section of said guidance map to achieve said predefined contrasting effect compared to said local background.

17. The view navigation guidance system of claim 15 wherein the code to apply said direct color transformation of said representative global background color is computed by decomposing said global background color into its primary color values and adjusting the primary colors values in accordance with user setup preferences.

18. The view navigation guidance system of claim 15 wherein said physical display further comprises touch interface, and wherein said human operator changes said location of said guidance map by finger gestures on said physical display.

19. The view navigation guidance system of claim 9 wherein the operation of said view navigation means depends on at least one user controlled auxiliary parameter, and wherein said executable code further comprising code for a user selected auxiliary control mode, said auxiliary control code further comprising:
code to record initial location of said guidance map from said record of coordinates when said auxiliary control mode is activated;
code to continuously retrieve said record of coordinates and measure changes of the current map location from its said initial location along a predefined path; and
code to change said auxiliary parameter in accordance with said changes of current map location.

20. The view navigation guidance system of claim 9 wherein said physical display further comprises touch interface, and wherein said guidance map is enclosed within a predefined touch area that will create a control signal responsive to taps made by the operator at said predefined touch area, whereby said process may use said control signal to activate a predefined function.

* * * * *